US012233749B2

(12) United States Patent
Zhu et al.

(10) Patent No.: US 12,233,749 B2
(45) Date of Patent: Feb. 25, 2025

(54) ELECTRIFIED VEHICLE CONFIGURED TO IDENTIFY BATTERY CONDITION BY CLASSIFYING DATA SET

(71) Applicant: Ford Global Technologies, LLC, Dearborn, MI (US)

(72) Inventors: Di Zhu, Novi, MI (US); Benjamin A. Tabatowski-Bush, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 17/943,293

(22) Filed: Sep. 13, 2022

(65) Prior Publication Data
US 2024/0083303 A1    Mar. 14, 2024

(51) Int. Cl.
*B60L 58/24*      (2019.01)
*B60L 58/12*      (2019.01)

(52) U.S. Cl.
CPC ............. *B60L 58/24* (2019.02); *B60L 58/12* (2019.02)

(58) Field of Classification Search
CPC ................................. B60L 58/24; B60L 58/12
See application file for complete search history.

(56) References Cited

U.S. PATENT DOCUMENTS

| | | |
|---|---|---|
| 2009/0218990 A1 | 9/2009 | Johnson et al. |
| 2011/0249371 A1 | 10/2011 | Jin et al. |
| 2015/0260800 A1* | 9/2015 | Baba .................. G01R 31/3648 |
| | | 702/63 |
| 2015/0301119 A1* | 10/2015 | Kwon .................... B60L 58/10 |
| | | 702/63 |
| 2017/0003339 A1 | 1/2017 | Zhao |
| 2017/0003352 A1* | 1/2017 | Barre ................... G01R 31/007 |
| 2017/0356962 A1* | 12/2017 | Takahashi ........... H01M 10/345 |
| 2018/0136285 A1* | 5/2018 | You ...................... G01R 31/392 |
| 2020/0164763 A1* | 5/2020 | Holme ................... B60L 58/16 |
| 2020/0319259 A1 | 10/2020 | Pressman et al. |
| 2020/0348365 A1 | 11/2020 | Wang et al. |
| 2020/0350770 A1 | 11/2020 | Dan et al. |
| 2021/0111443 A1 | 4/2021 | Wang et al. |
| 2021/0156921 A1* | 5/2021 | Kazuno ............ H01M 10/4207 |
| 2021/0170906 A1* | 6/2021 | Kimura ................... B60L 58/14 |
| 2021/0190881 A1 | 6/2021 | Lee et al. |
| 2022/0276320 A1* | 9/2022 | Lee ..................... G01R 31/3648 |

FOREIGN PATENT DOCUMENTS

| | | |
|---|---|---|
| CN | 102494778 B | 4/2013 |
| CN | 110361654 A | 10/2019 |
| CN | 111653840 B | 7/2021 |
| EP | 3757590 A1 | 12/2020 |

\* cited by examiner

*Primary Examiner* — Long T Tran
(74) *Attorney, Agent, or Firm* — David B. Kelley; Carlson, Gaskey & Olds, P.C.

(57) ABSTRACT

This disclosure relates to an electrified vehicle configured to identify a battery condition, such as a thermal event and/or an open circuit event, by classifying a data set, and a corresponding method. In some aspects, the techniques described herein relate to an electrified vehicle, including: a battery pack; a sensor configured to generate signals indicative of a property of the battery pack; and a computing system including a controller and a classification model, wherein the controller is configured to interpret the signals from the sensor to obtain a data set corresponding to the properties of the battery pack over a period of time, and wherein the controller is configured to use the classification model to classify the data set as a thermal event.

20 Claims, 2 Drawing Sheets

ELECTRIFIED VEHICLE CONFIGURED TO IDENTIFY BATTERY CONDITION BY CLASSIFYING DATA SET

TECHNICAL FIELD

This disclosure relates to an electrified vehicle configured to identify a battery condition, such as a thermal event and/or an open circuit event, by classifying a data set, and a corresponding method.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells and various other battery internal components that support electric propulsion of electrified vehicles.

SUMMARY

In some aspects, the techniques described herein relate to an electrified vehicle, including: a battery pack; a sensor configured to generate signals indicative of a property of the battery pack; and a computing system including a controller and a classification model, wherein the controller is configured to interpret the signals from the sensor to obtain a data set corresponding to the properties of the battery pack over a period of time, and wherein the controller is configured to use the classification model to classify the data set as a thermal event.

In some aspects, the techniques described herein relate to an electrified vehicle, wherein the controller is configured to use the classification model to classify the data set as either a thermal event or an open circuit event.

In some aspects, the techniques described herein relate to an electrified vehicle, wherein the controller is configured such that the controller does not attempt to identify an open circuit event other than by using the classification model to classify the data set.

In some aspects, the techniques described herein relate to an electrified vehicle, wherein: the thermal event is an event during which the battery pack is heating or charging in excess of a corresponding threshold, and the open circuit event is an event during which components of the sensor have become mechanically separated.

In some aspects, the techniques described herein relate to an electrified vehicle, wherein the controller is configured to evaluate a validity of each data point in the data set, and the controller is configured to omit from the data set any data points that are not deemed valid.

In some aspects, the techniques described herein relate to an electrified vehicle, wherein the controller is configured to deem a data point to not be valid if the data point is outside a predetermined range.

In some aspects, the techniques described herein relate to an electrified vehicle, wherein the classification model is generated using a classifier.

In some aspects, the techniques described herein relate to an electrified vehicle, wherein the classifier is trained by exposure to a plurality of sets of data.

In some aspects, the techniques described herein relate to an electrified vehicle, wherein the classifier includes a principal component analysis.

In some aspects, the techniques described herein relate to an electrified vehicle, wherein the classifier includes a neural network.

In some aspects, the techniques described herein relate to an electrified vehicle, wherein the neural network is either local to the electrified vehicle or remote from the electrified vehicle.

In some aspects, the techniques described herein relate to an electrified vehicle, wherein the classification model will not classify a data set as a thermal event unless multiple data points in the data set are classifiable, when considered together, as a thermal event.

In some aspects, the techniques described herein relate to an electrified vehicle, wherein the electrified vehicle is a battery electric vehicle.

In some aspects, the techniques described herein relate to an electrified vehicle, further including an electric machine configured to propel the electrified vehicle, and wherein the battery pack is configured to deliver power to the electric machine.

In some aspects, the techniques described herein relate to an electrified vehicle, wherein the sensor is: a temperature sensor configured to generate signals indicative of a temperature of the battery pack, a voltage sensor configured to generate signals indicative of a voltage of one or more cells or arrays of cells within the battery pack, or a pressure sensor configured to generate signals indicative of a pressure of the battery pack.

In some aspects, the techniques described herein relate to an electrified vehicle, wherein controller is in communication with at least two types of sensors selected from the group of the temperature sensor, the voltage sensor, and the pressure sensor, and the controller is configured to use the classification model to classify a data set obtained from the at least two types of sensors as a thermal event.

In some aspects, the techniques described herein relate to a method, including: using a computing system of an electrified vehicle to classify a data set as a thermal event of a battery pack of the electrified vehicle, wherein the data set includes a plurality of data points, and wherein each data point is a property of the battery pack at a point in time.

In some aspects, the techniques described herein relate to a method, further including: using the computing system to classify another data set as either a thermal event or an open circuit event.

In some aspects, the techniques described herein relate to a method, wherein the computing system does not attempt to identify an open circuit event other than by classifying the data set.

In some aspects, the techniques described herein relate to a method, wherein the computing system will not identify a thermal event unless multiple data points in the data set are classifiable, when considered together, as a thermal event.

DETAILED DESCRIPTION

This disclosure relates to an electrified vehicle configured to identify a battery condition, such as a thermal event and/or an open circuit event, by classifying a data set, and a corresponding method. Among other benefits, which will be appreciated from the below description, the disclosed arrangement is able to efficiently and readily classify a data set as one of multiple possible battery conditions.

Figure 1:
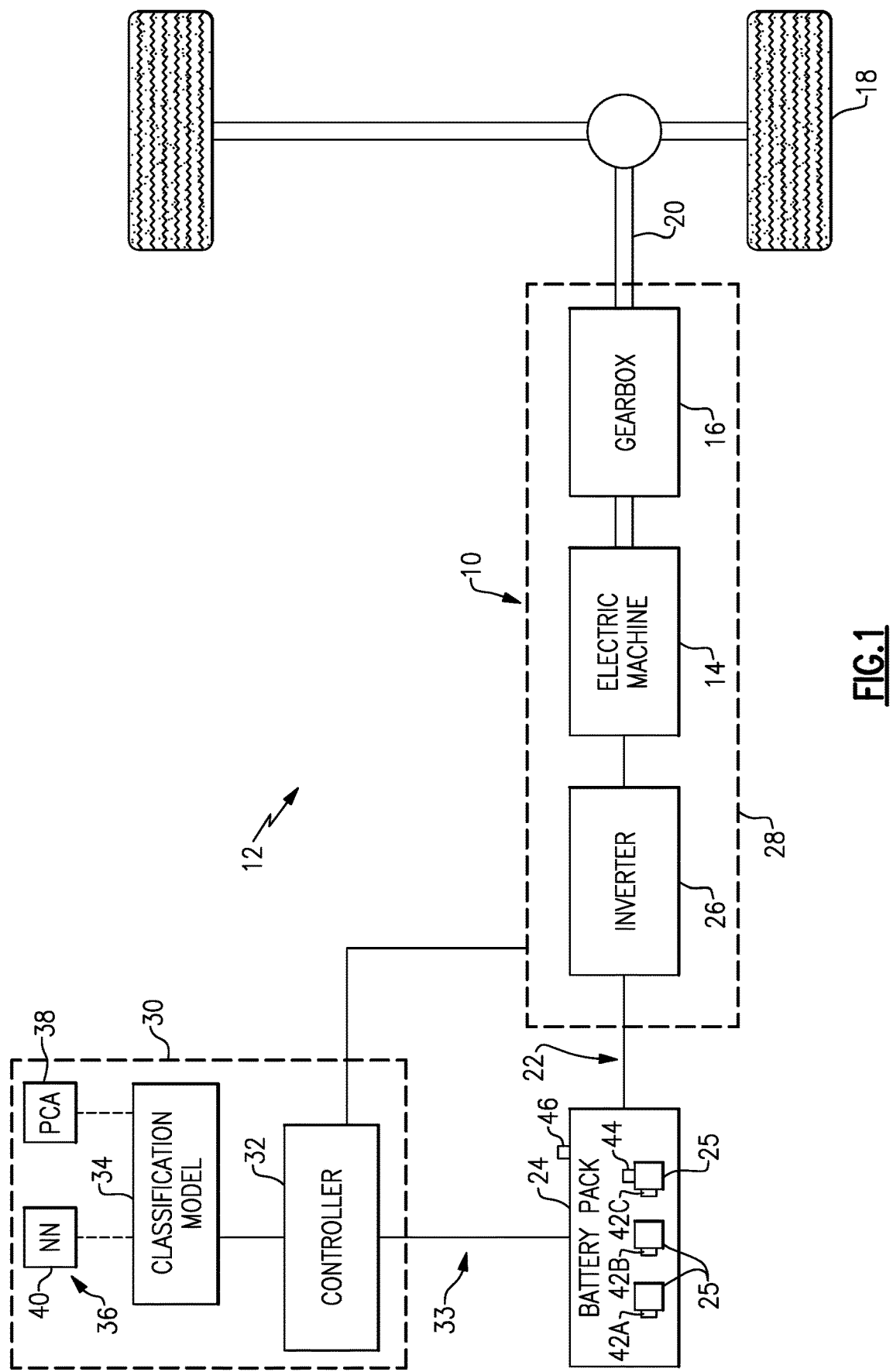
FIG. 1 schematically illustrates an example powertrain of an electrified vehicle and an example computing system.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The powertrain 10 shown in FIG. 1 is highly schematic and is not intended to limit this disclosure. Various additional components could alternatively or additionally be employed by the powertrain 10 within the scope of this disclosure.

The electrified vehicle 12 further includes a computing system 30. The computing system 30 includes a controller 32, which may include various electronics, a processing unit, software, and non-transitory memory such that the controller 32 can perform the necessary control functions for operating the electrified vehicle 12 and executing various functions described herein. In one non-limiting embodiment, the controller 32 is a combination vehicle system controller and powertrain control module (VSC/PCM). Although it is shown as a single hardware device, the controller 32 may include multiple controllers in the form of multiple hardware devices, or multiple software controllers within one or more hardware devices. A controller area network 33 (CAN) allows the controller 32 to communicate with the various components of the electrified vehicle 12.

The controller 32 includes a classification model 34. The classification model 34 is a program embodied on the controller 32 and is configured to classify a given data set, which is a collection of data, into a particular class or category. In this example, the classification model 34 is generated by a classifier 36, which is trained over time by exposing the classifier 36 to various data sets. The classifier 36 may be embodied remote from the electrified vehicle 12. The classifier 36 may specifically be embodied on one or more computers in a laboratory setting, for example. The classifier 36 may include or rely a series of algorithms. Further, the classifier 36 may include or rely on principal component analysis (PCA) 38 and/or an artificial neural network 40 ("neural network 40"). The classification model 34 may be generated before the classification model 34 is implemented onto the controller 32. The classifier 36 may be exposed to a plurality of data sets corresponding to known classes so the classifier 36 gradually builds the classification model 34 over time as the classifier 36 identifies trends in the data sets. The classifier 36 may be trained in a supervised manner, in which the classifier 36 is informed that a particular data set corresponds to a particular class, or an unsupervised manner. Regardless, as the classifier 36 is trained, the classification model 34 is gradually generated over time, including being refined over time as necessary depending on what is indicated in the data sets used to train the classifier 36. When the classification model 34 is able to adequately classify various data sets, the classification model 34 can then be implemented on the controller 32. In some examples, the classification model 34 is unchanged after implementation onto the controller 32. In other examples, the classifier 36 may be embodied in whole or in part on a cloud based service and configured to interface with the electrified vehicle 12 such that the classifier 36 can update the classification model 34 while the classification model 34 is embodied on the controller 32. In one particular example, the neural network 40 can make updates to the classification model 34 while the classification model 34 is embodied on the controller 32.

In this disclosure, the controller 32 is able to use the classification model 34 to classify data sets including temperatures of the battery pack 24 as corresponding to a particular condition of the battery pack 24, which are conditions related to the operation of the battery pack 24. In this regard, the controller 32 is in communication with one or more sensors configured to generate signals indicative of properties of the battery pack 24. The term property is used herein to refer to individual measured items indicative of the physical attributes of the battery pack 24, such as temperature, pressure, and voltage. Here, the battery pack 24 includes a plurality of sensors 42A-42C configured to generate signals indicative of the temperature of the battery pack 24. The battery pack 24 also includes a sensor 44 configured to generate signals indicative of a voltage of one or more of the cells within the battery pack 24, and the battery pack 24 further includes a sensor 46 configured to generate signals indicative of a pressure of the battery pack 24. The sensor 46 may be a battery pack pressure sensor (BPPS). While a particular quantity of each sensor type is shown, it should be understood that this disclosure extends to arrangements with a different quantity of sensors. For instance, the battery pack 24 could include a voltage sensor associated with each cell or array of cells within the battery pack 24.

With respect to the sensors 42A-42C, each of the sensors 42A-42C is mounted adjacent a different cell, or a different array, within the battery pack 24, in this example. In one example, the controller 32 considers a highest-reported temperature of the sensors 42A-42C as the temperature of the battery pack 24, such that the control strategy discussed herein is implemented relative to the hottest battery cell temperature. Other techniques for determining the temperature of the battery pack 24 come within the scope of this disclosure.

The sensors 42A-42C are thermistors in one example. As is known of thermistors, each of the sensors 42A-42C includes a resistor element and lead material. This disclosure is not limited to thermistors, and extends to other types of temperature sensors.

During operation of the electrified vehicle 12, the battery cells and internal components of the battery pack 24 can experience a rare thermal event in which the battery pack 24 is overheating or overcharging (i.e., current is forced through a cell of the battery pack 24 after all the active material has been converted to a charged state), or in other words the battery pack 24 is heating or charging in excess of a corresponding threshold, which may be an amount set by a manufacturer of the battery pack 24 and/or the cells of the battery pack 24. Various other events of varying degrees of rarity may also occur. One example event includes an open circuit event in which components within one of the sensors 42A-42C, 44, or 46 become mechanically separated. As one example, an open circuit event may include a resistor element and lead material within one of the sensors 42A-42C becoming mechanically separated.

Figure 2:
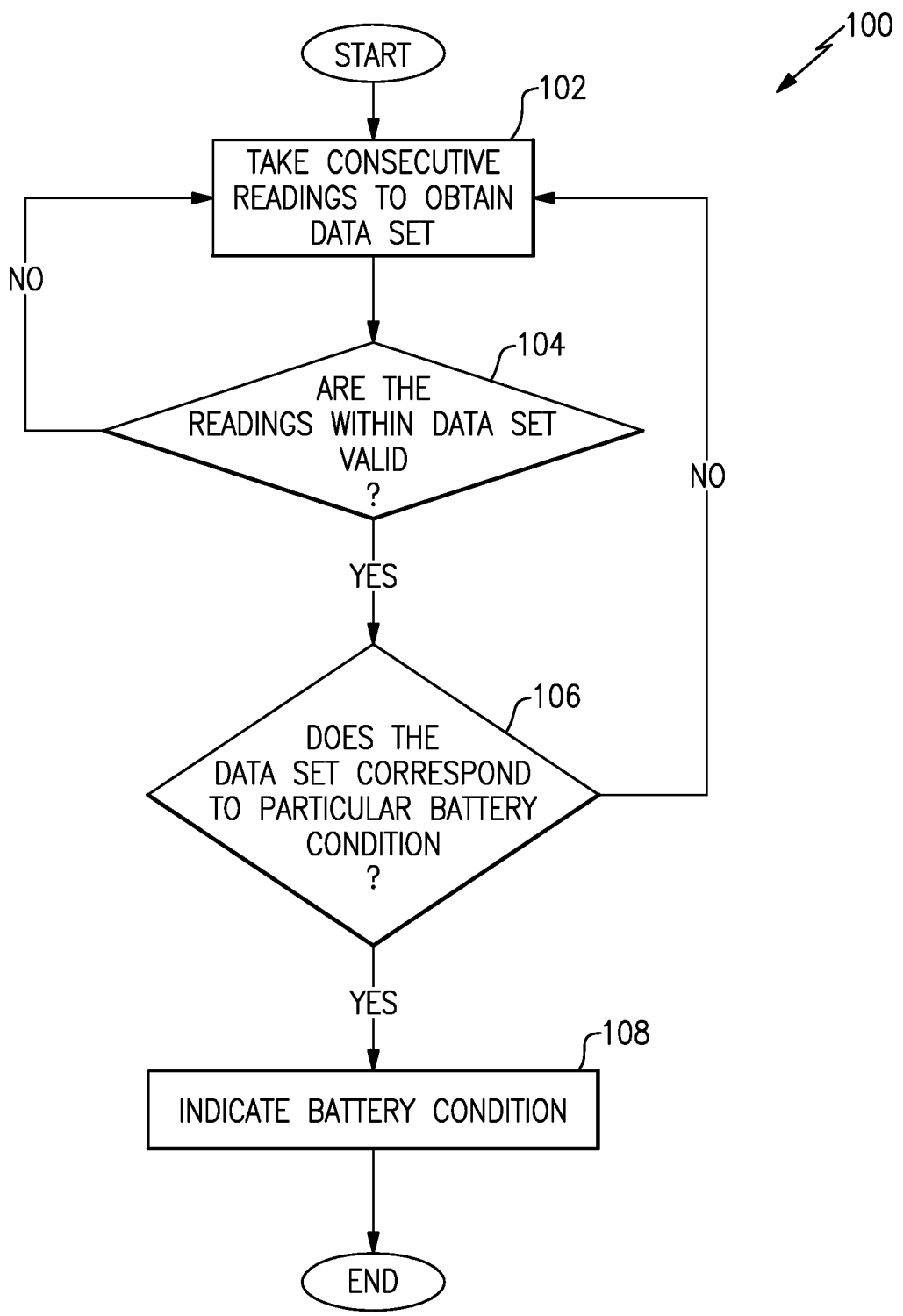
FIG. 2 is a flow chart representative of an example method of the present disclosure.

This disclosure is able to classify a set of data including temperatures of the battery pack 24 over a particular period as a particular battery condition, namely as a thermal event or an open circuit event. An example method will now be described with reference to the flowchart of FIG. 2 and with continued reference to FIG. 1.

In an example method 100, at 102, the controller 32 takes consecutive readings from the sensors 42A-42C to gather a data set including a plurality of data points, each of which is a temperature of the battery pack 24 at a particular time. In an example, the controller 32 takes readings from the sensors 42A-42C every second and gathers five data points each second, with one data point being taken every 0.2 seconds, such that the data set includes five data points, corresponding to five temperature readings of the battery pack 24 every 0.2 seconds. The manner in which the data set is obtained may vary.

At 104, the controller 32 may consider whether the points in the data set, or the data set overall, are valid. In particular, the controller 32 may deem data points outside a predefined range to be invalid. The predefined range, in one example, is a wider range than what is reasonably expected during normal operation of the electrified vehicle 12, and is also a wider range than what is reasonably expected during a thermal event or an open circuit event. If a particular data point is not deemed valid, the data point may be omitted from the data set. Alternatively, if the data set includes any data points that are not deemed valid, the entire data set may be disregarded.

At 106, the controller 32 is configured to use the classification model 34 to determine whether the data set can be classified as a particular battery condition, including a thermal event and/or an open circuit event. In a particular aspect of this disclosure, the controller 32 is configured to use the classification model 34 to classify a particular data set as either a thermal event or an open circuit event. In this regard, the controller 32 is able to use the classification model 34 to determine whether a single data set corresponds to one of two distinct types of battery conditions. While two conditions are mentioned, the controller 32 could use the classification model 34 to classify a data set as one of multiple distinct types of battery conditions. Table 1, below, includes three exemplary data sets that may be classified at step 106.

TABLE 1

| Time (s) | Data Set 1 | Data Set 2 | Data Set 3 |
| --- | --- | --- | --- |
| 0.2 | 49.4° C. | 49.6° C. | 33.0° C. |
| 0.4 | 54.8° C. | 54.5° C. | 33.2° C. |
| 0.6 | 62.5° C. | 60.4° C. | 33.3° C. |
| 0.8 | 72.6° C. | 66.4° C. | 100° C. |
| 1.0 | 84.9° C. | 74.9° C. | 100° C. |

Table 1 above includes three exemplary data sets obtained by the controller 32 based on readings from the temperature sensors 42A-42C. The data sets were taken at different times, over the course of 1 second. In other words, each of the data sets was taken as step 102 was performed three distinct times. Each data set includes five data points, with temperature readings taken at 0.2 second intervals. Each of the data sets were deemed valid, at step 104.

In general, data set 3 includes a sharp increase in temperatures between times 0.6 seconds and 0.8 seconds, whereas data sets 1 and 2 exhibit relatively more gradual temperature increases from times 0.2 seconds to 1.0 seconds. Further, data set 1 generally exhibits a relatively more rapid rate of change than data set 2. In the above examples, at 106, the controller 32 uses the classification model 34 to classify data sets 1 and 2 as thermal events. Further, the controller 32 uses the classification model 34 to classify data set 3 as an open circuit event.

In response to data sets 1 and 2, the controller 32 would indicate a thermal event has occurred, at 108, and in response to data set 3, the controller 32 would indicate an open circuit event has occurred, at 108. Being able to readily distinguish between these different battery conditions is beneficial because different actions may be taken by the electrified vehicle 12 and/or the user in response to an identification of one type of event rather than another.

The above example illustrates a contrast between the present disclosure relative to other known techniques for identifying thermal events and/or other battery conditions. In known techniques, a controller may compare battery temperatures to an absolute threshold or a fixed rate of change threshold. Other known techniques may include a fixed algorithm applying fixed weights to certain variables in an effort to identify certain battery conditions. On the other hand, the computing system 30 will not identify a particular battery condition, such as a thermal event or an open circuit event, unless multiple data points in the data set, considered together, indicate a trend that is classifiable as such.

With reference to Table 1, if a known system used an absolute threshold of 70° C. as corresponding to a battery thermal event, then the known system would have inappropriately deemed data set 3 to correspond to a thermal event when, in reality, it does not. At a minimum, known systems would not identify a thermal event as quickly as the present disclosure, because known systems would have to follow a series of additional steps to rule out a thermal event and eventually conclude that an open circuit event was occurring.

Further, if a known system was monitoring for a particular temperature rate of change, that known system may not have identified data set 2 as a thermal event because data set 2 exhibited a relatively gradual rate of change, when, in reality, data set 2 did correspond to a thermal event. At a minimum, such known systems would not identify a thermal event as quickly as the present disclosure. Further still, known techniques that employ fixed algorithms are not as efficient or effective as the techniques described in the present disclosure.

With respect to the open circuit event in particular, the computing system 30 will not attempt to identify an open circuit event other than by classifying data sets, at 106. In particular, the computing system 30 will not attempt to analyze any signals coming from the sensors 42A-42C, other than the signals indicative of temperature of the battery pack 24, such as any signals that correspond to an operating status of the sensors 42A-42C. Further, the electrified vehicle 12 will not include any separate, dedicated sensors configured to generate signals indicative of an operating status of the sensors 42A-42C.

In the example discussed relative to Table 1, the controller 32 only considers information from the sensors 42A-42C. It should be understood, however, that the controller 32 can consider additional inputs from other sensors as an alternative to, or in combination with, the information from the sensors 42A-42C. For instance, the controller 32 could receive signals from the sensor 44 and/or the sensor 46. In that example, the classifier 36 would have been trained to classify the data sets obtained from those types of signals, either separately or when considered together, as a thermal event and/or an open circuit event, such that the controller 32 can use the classification model 34 to classify the data set(s) from the sensor 44 and/or sensor 46 as a thermal event and/or an open circuit event, at 106. The controller 32 is also programmed with predefined ranges of valid voltages and pressures, such that the controller 32 can omit data points that are not deemed valid, at 104.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
a battery pack;
a sensor configured to generate signals indicative of a property of the battery pack; and
a computing system including a controller and a classification model, wherein the controller is configured to interpret the signals from the sensor to obtain a data set corresponding to the properties of the battery pack over a period of time, and wherein the controller is configured to use the classification model to classify the data set as a thermal event.

2. The electrified vehicle as recited in claim 1, wherein the controller is configured to use the classification model to determine whether the data set corresponds to a thermal event, and wherein the controller is also configured to use the classification model to determine whether the data set corresponds to an open circuit event.

3. The electrified vehicle as recited in claim 2, wherein the controller is configured such that the controller does not attempt to identify an open circuit event other than by using the classification model to classify the data set.

4. The electrified vehicle as recited in claim 2, wherein:
the thermal event is an event during which the battery pack is heating or charging in excess of a corresponding threshold, and
the open circuit event is an event during which components of the sensor have become mechanically separated.

5. The electrified vehicle as recited in claim 2, wherein the controller is configured to use the classifier to distinguish the data set between a thermal event and an open circuit event.

6. The electrified vehicle as recited in claim 1, wherein the controller is configured to evaluate a validity of each data point in the data set, and the controller is configured to omit from the data set any data points that are not deemed valid.

7. The electrified vehicle as recited in claim 6, wherein the controller is configured to deem a data point to not be valid if the data point is outside a predetermined range.

8. The electrified vehicle as recited in claim 1, wherein the classification model is generated using a classifier.

9. The electrified vehicle as recited in claim 8, wherein the classifier is trained by exposure to a plurality of sets of data.

10. The electrified vehicle as recited in claim 8, wherein the classifier includes a principal component analysis.

11. The electrified vehicle as recited in claim 8, wherein the classifier includes a neural network.

12. The electrified vehicle as recited in claim 11, wherein the neural network is either local to the electrified vehicle or remote from the electrified vehicle.

13. The electrified vehicle as recited in claim 1, wherein the classification model will not classify a data set as a thermal event unless multiple data points in the data set are classifiable, when considered together, as a thermal event.

14. The electrified vehicle as recited in claim 1, wherein the electrified vehicle is a battery electric vehicle.

15. The electrified vehicle as recited in claim 1, wherein the sensor is:
a temperature sensor configured to generate signals indicative of a temperature of the battery pack,
a voltage sensor configured to generate signals indicative of a voltage of one or more cells or arrays of cells within the battery pack, or
a pressure sensor configured to generate signals indicative of a pressure of the battery pack.

16. The electrified vehicle as recited in claim 15, wherein controller is in communication with at least two types of sensors selected from the group of the temperature sensor, the voltage sensor, and the pressure sensor, and the controller is configured to use the classification model to classify a data set obtained from the at least two types of sensors as a thermal event.

17. A method, comprising:
using a computing system of an electrified vehicle to classify a data set as a thermal event of a battery pack of the electrified vehicle, wherein the data set includes a plurality of data points, and wherein each data point is a property of the battery pack at a point in time.

18. The method as recited in claim 17, further comprising: using the computing system to determine whether another data set corresponds to a thermal event, and also using the computing system to determine whether the other data corresponds to an open circuit event.

19. The method as recited in claim 18, wherein the computing system does not attempt to identify an open circuit event other than by classifying the data set.

20. The method as recited in claim 17, wherein the computing system will not identify a thermal event unless multiple data points in the data set are classifiable, when considered together, as a thermal event.

* * * * *